US012183522B1

(12) United States Patent
Bao

(10) Patent No.: US 12,183,522 B1
(45) Date of Patent: Dec. 31, 2024

(54) PULL-OUT KEYBOARD ASSEMBLY TECHNICAL FIELD

(71) Applicant: Shimeng Bao, Guangdong (CN)

(72) Inventor: Shimeng Bao, Guangdong (CN)

( * ) Notice: Subject to any disclaimer, the term of this patent is extended or adjusted under 35 U.S.C. 154(b) by 0 days.

(21) Appl. No.: 18/807,919

(22) Filed: Aug. 17, 2024

(30) Foreign Application Priority Data

Jun. 24, 2024 (CN) ......................... 202421446028.3

(51) Int. Cl.
*H01H 13/86* (2006.01)
*G06F 3/02* (2006.01)

(52) U.S. Cl.
CPC ........... *H01H 13/86* (2013.01); *G06F 3/0221* (2013.01)

(58) Field of Classification Search
CPC ... H04B 5/00; H04B 5/24; H04B 5/26; H04B 5/40; F16M 2200/00; F16M 2200/02; F16M 2200/021; F16M 2200/83; F16M 11/00; F16M 11/04; F16M 11/041; F16M 11/045; F16M 11/048; F16M 11/06; F16M 11/10; A45F 5/00; H01F 1/00; G06F 1/1613; G06F 1/1616; G06F 1/1618; G06F 1/1628; G06F 1/1654; G06F 1/1665; G06F 1/1669; G06F 1/1633; G06F 1/1637; G06F 3/00; G06F 3/02; G06F 3/0221; H01H 2009/02; H01H 2009/04; H01H 2223/00; H01H 2223/01; H01H 2223/012; H01H 2223/016; H01H 2223/018; H01H 2223/02; H01H 2223/028; H01H 2223/034; H01H 2223/04; H01H 2223/042; H01H 2223/044; H01H 2223/046; H01H 2223/048; H01H 2223/05; H01H 2231/016; H01H 9/02; H01H 9/0207; H01H 13/00; H01H 13/04; H01H 13/10; H01H 13/70; H01H 13/86; H01H 21/00; H01H 21/04; H01H 21/08; H01H 63/34
USPC .................................................. 200/293, 341
See application file for complete search history.

(56) References Cited

U.S. PATENT DOCUMENTS

| | | | | |
|---|---|---|---|---|
| 6,351,372 B1 * | 2/2002 | Kim | G06F 1/1616 400/489 |
| 2014/0118917 A1 * | 5/2014 | Yu | G06F 1/1662 361/679.09 |

FOREIGN PATENT DOCUMENTS

| | | |
|---|---|---|
| CN | 114461082 A * | 5/2022 |

* cited by examiner

*Primary Examiner* — Anthony R Jimenez
(74) *Attorney, Agent, or Firm* — Justin Lampel

(57) ABSTRACT

The present invention discloses a pull-out keyboard assembly, including: a base bracket mechanism, including a base body, where the base body is respectively provided with sliding grooves at two opposite ends; a rotating shaft bracket assembly movably arranged on the base body; and at least one restraint block and at least one first magnetic member respectively fixedly arranged on the base body; a keyboard mechanism, including a keyboard assembly and multiple ball assemblies respectively arranged on opposite sides of the keyboard assembly, where the keyboard assembly is fixedly provided with at least one restraint magnetic set, and the restraint magnetic set includes multiple second magnetic members arranged in parallel along a Y-axis direction; and a protective housing arranged on the rotating shaft bracket assembly, where the protective housing is snap-fitted into the keyboard mechanism through the rotating shaft bracket assembly.

18 Claims, 9 Drawing Sheets

PULL-OUT KEYBOARD ASSEMBLY TECHNICAL FIELD

TECHNICAL FIELD

The present invention relates to the technical field of keyboards, and specifically, to a pull-out keyboard assembly.

TECHNICAL BACKGROUND

With rapid development of the computer industry, various high-end electronic products have emerged substantially, especially, tablet computers, which are generally recognized and favored by plenty of consumers by virtue of their characteristics such as compact structures, comfortableness, simple operation and convenience in use. In the prior art, the tablet computers generally adopt embedded keyboards, or in other words, keyboard functions are implemented by users through operations on touchscreens, causing disadvantages such as inconvenience in use and unsatisfactory operation effects.

The patent with the publication number CN114461082A provides a wireless keyboard for a tablet computer, including: a first damped rotating shaft; a support plate and a keyboard bottom plate, where the support plate is rotatably connected with the keyboard bottom plate through the first damped rotating shaft; and a support block, where when the wireless keyboard is closed, the support block is on one side, farther away from the keyboard bottom plate, of the first damped rotating shaft, and the support block can come into contact with a placement surface when the first damped rotating shaft is rotated, so that the keyboard bottom plate is obliquely arranged relative to the placement surface. Although the technical solution can improve viewing experience for the screen and improve comfort of the users during typing with both hands, it is inconvenient for the users to use keys on an upper part of the keyboard and consequently, user experience is affected because the keyboard is fixed to a bracket and a bottom of the tablet computer is relatively close to the keys on the upper part of the keyboard when the tablet computer is placed on the bracket. Therefore, a pull-out keyboard assembly is provided to resolve the problem of poor user experience in the existing tablet keyboard with a rotating shaft bracket.

SUMMARY

One of objectives of the present invention is to provide a pull-out keyboard assembly, to resolve a problem of poor user experience of existing tablet keyboards with rotating shaft brackets.

The pull-out keyboard assembly in the present invention can be implemented via the following technical solutions:

The pull-out keyboard assembly in the present invention includes a base bracket mechanism, provided with sliding grooves at two opposite ends respectively; and a keyboard mechanism whose two ends are respectively movably arranged in corresponding sliding grooves, where the base bracket mechanism is fixedly provided with at least one first magnetic member; and the keyboard mechanism is fixedly provided with at least one restraint magnetic set, the restraint magnetic set includes multiple second magnetic members arranged in parallel along a Y-axis direction, and the multiple second magnetic members respectively mutually attract corresponding first magnetic members, to implement fixation of different relative positions of the keyboard mechanism and the base bracket mechanism.

In an embodiment, the base bracket mechanism further includes: a base body, where two sliding grooves are respectively arranged at two opposite ends of the base body; a rotating shaft bracket assembly movably arranged on the base body; at least one restraint block fixedly arranged on the base body; and at least one first magnetic member fixedly arranged on the base body.

In an embodiment, the base body is separately provided with at least one first accommodating groove and at least one accommodating cavity, at least one first magnetic member is fixedly arranged in the corresponding first accommodating groove, and at least one restraint block is fixedly arranged in a corresponding accommodating cavity.

In an embodiment, the rotating shaft bracket assembly includes a connecting plate, movably arranged on the base body through a first rotating shaft; and a bracket movably arranged on the connecting plate through a second rotating shaft.

In an embodiment, the first rotating shaft and the second rotating shaft are both damped rotating shafts.

In an embodiment, the keyboard mechanism includes: a keyboard assembly with two ends respectively movably arranged in corresponding sliding grooves; and multiple ball assemblies that are respectively arranged on opposite sides of the keyboard assembly and that can come into contact with inner walls of the sliding grooves.

In an embodiment, the keyboard assembly further includes a keyboard body and a keyboard bottom plate fixedly arranged on the keyboard body; and at least one restraint magnetic set is fixedly arranged on an outer or inner side of the keyboard bottom plate.

In an embodiment, a restraint cavity is arranged at a position, corresponding to the restraint block, on the outer side of the keyboard bottom plate and the restraint block is movably arranged in the corresponding restraint cavity.

In an embodiment, the ball assembly includes a support frame, fixedly arranged on a side of the keyboard assembly; and at least one ball body that is movably arranged on the support frame and that comes into rolling contact with the inner wall of the sliding groove.

The pull-out keyboard assembly in the present invention further includes a protective housing, where the protective housing is arranged on the base bracket mechanism.

Compared with the prior art, the pull-out keyboard assembly in the present invention has the following beneficial effects:

Based on the pull-out keyboard assembly in the present invention, the multiple second magnetic members respectively mutually attract the corresponding first magnetic members, to implement fixation at different relative positions of the keyboard mechanism and the base bracket mechanism, thereby effectively resolving the problem that the existing tablet keyboard with the rotating shaft bracket causes poor user experience. The multiple ball assemblies are arranged on two sides of the keyboard assembly, and the ball assemblies come into rolling contact with the sliding grooves, so that the keyboard assembly is moved relative to the base bracket mechanism more conveniently with smaller force. In addition, the restraint block and the restraint cavity are fitted, which can effectively prevent the keyboard mechanism from falling off the base bracket mechanism, so that relative positions of the keyboard assembly and the base bracket mechanism can be adjusted in limited movement space.

BRIEF DESCRIPTION OF THE DRAWINGS

To explain the technical solution in embodiments in the present invention more clearly, the following briefly introduces the accompanying drawings required in the embodiments. It should be understood that the following accompanying drawings show only some embodiments of the present invention, and therefore, should not be construed as a limitation on the scope. A person of ordinary skill in the art may still derive other relevant drawings from these accompanying drawings without creative efforts.

Figure 1:
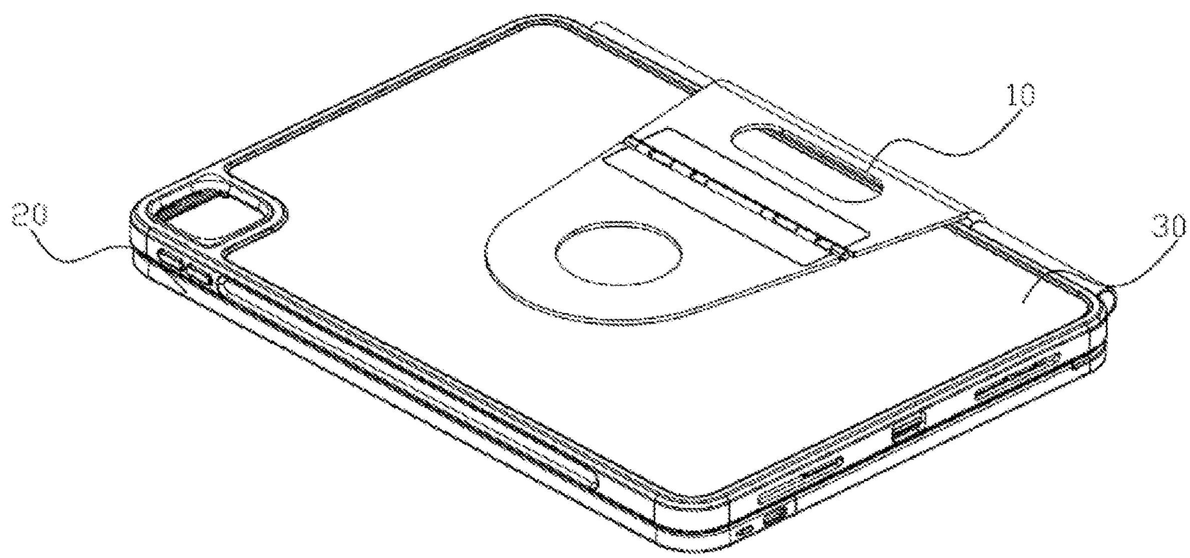
FIG. 1 is a schematic structural diagram of a pull-out keyboard assembly in a closed state in the present invention.
Figure 2:
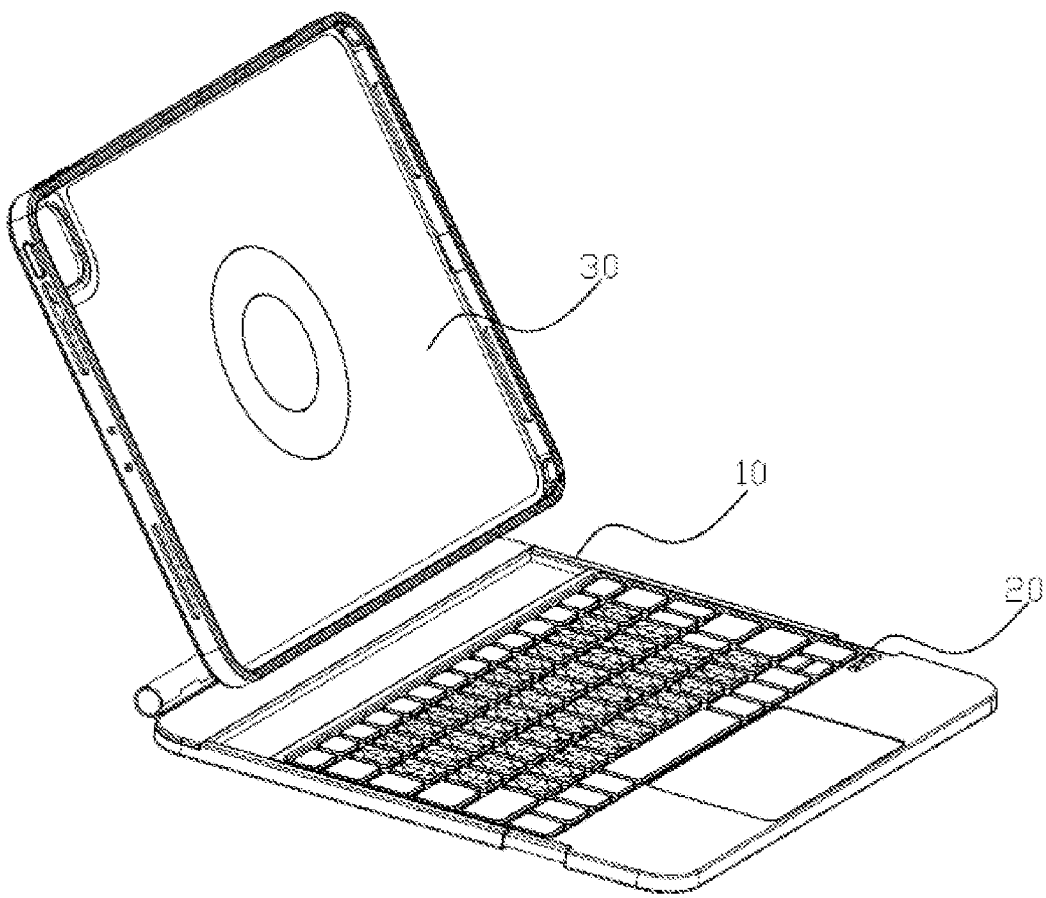
FIG. 2 is a schematic structural diagram of the pull-out keyboard assembly shown in FIG. 1 in a first use state in the present invention.
Figure 3:
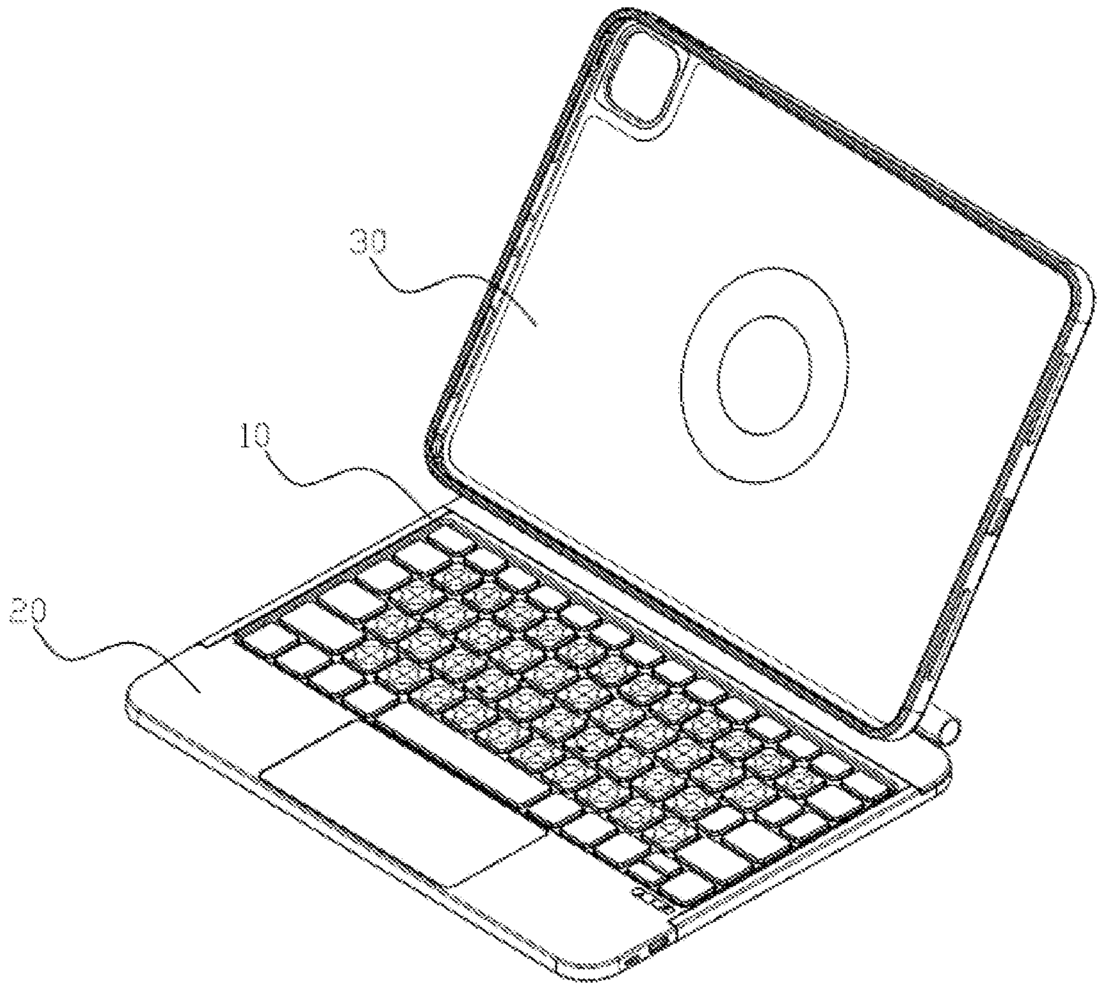
FIG. 3 is a schematic structural diagram of the pull-out keyboard assembly shown in FIG. 1 in a second use state in the present invention.

Reference signs in the figures: 10. base bracket mechanism; 11. base body; 111. sliding groove; 112. first accommodating groove; 113. accommodating cavity; 12. rotating shaft bracket assembly; 121. first rotating shaft; 122. connecting plate; 123. second rotating shaft; 124. bracket; 1241. magnetic portion; 13. first magnetic member; 14. restraint block; 20. keyboard mechanism; 21. keyboard assembly; 211. keyboard body; 2111. fixing seat; 212. keyboard bottom plate; 2121. second accommodating groove; 2122. restraint cavity; 213. restraint magnetic set; 2131. second magnetic member; 22. ball assembly; 221. support frame; 2211. ball hole; 2212. fixing hole; 222. ball body; 23. fastener; and 30. protective housing.

DETAILED DESCRIPTION OF EMBODIMENTS

To make objectives, technical solutions, and advantages of the embodiments of the present invention clearer, the following clearly and completely describes the technical solutions in the embodiments of present invention with reference to the accompanying drawings in the embodiments of the present invention. Apparently, the described embodiments are some but not all of the embodiments of the present invention. Generally, components in the embodiments of the present invention described and shown in the accompanying drawings may be arranged and designed through various configurations.

Therefore, the following detailed description of the embodiments of the present invention provided in the accompanying drawings is not intended to limit the claimed scope of the present invention, but merely indicates selected embodiments of the present invention. All other embodiments obtained by those of ordinary skill in the art based on the embodiments of the present invention without creative efforts shall fall within the protection scope of the present invention.

Referring to FIG. 1 to FIG. 9, a pull-out keyboard assembly in the present invention mainly includes a base bracket mechanism 10, a keyboard mechanism 20, and a protective housing 30. The base bracket mechanism 10 is a support body. The keyboard mechanism 20 is movably arranged on the base bracket mechanism 10, and can be slid relative to the base bracket mechanism 10. The protective housing 30 is arranged on the base bracket mechanism 10 and can be snap-fitted onto the keyboard mechanism 20 through the base bracket mechanism 10, and the tablet computer is detachably arranged in the protective housing 30.

Referring to FIG. 1 to FIG. 5, the base bracket mechanism 10 includes the base body 11, the rotating shaft support assembly 12, at least one first magnetic member 13 and at least one restraint block 14. The base body 11 is a support body, sliding grooves 111 are arranged at two opposite ends of the support body, two ends of the keyboard mechanism 20 are movably arranged in corresponding sliding grooves 111 respectively, and movement of the keyboard mechanism 20 is guided through the sliding groove 111. The rotating shaft bracket assembly 12 is movably arranged on the base body 11 and can be rotated relative to the base body 11, the protective housing 30 is arranged on the rotating shaft bracket assembly 12, and the rotating shaft bracket assembly 12 drives angle adjustment of the tablet computer arranged in the protective housing 30 relative to the base body 11, so that a user can view the tablet computer at different visual angles. At least one first magnetic member 13 and at least one restraint block 14 are respectively fixedly arranged in the base body 11, and at least one first magnetic member 13 attracts the keyboard mechanism 20, to fix relative positions of the keyboard mechanism 20 and the base body 11. At least one restraint block 14 restrains movement of the keyboard mechanism 20 on the base body 11, to prevent the keyboard mechanism 20 from slipping off the base body 11. In this embodiment, three magnetic members 13 are fixed in the base body 11 along a straight line in a horizontal direction; and two restraint blocks 14 are arranged in the base body 11. In other embodiments, the number of magnetic members 13 may be one or more than one, and the number of restraint blocks 14 may be one or more than one, and the numbers of magnetic members and restraint blocks are set according to an actual need, provided that this application is satisfied.

Figure 5:
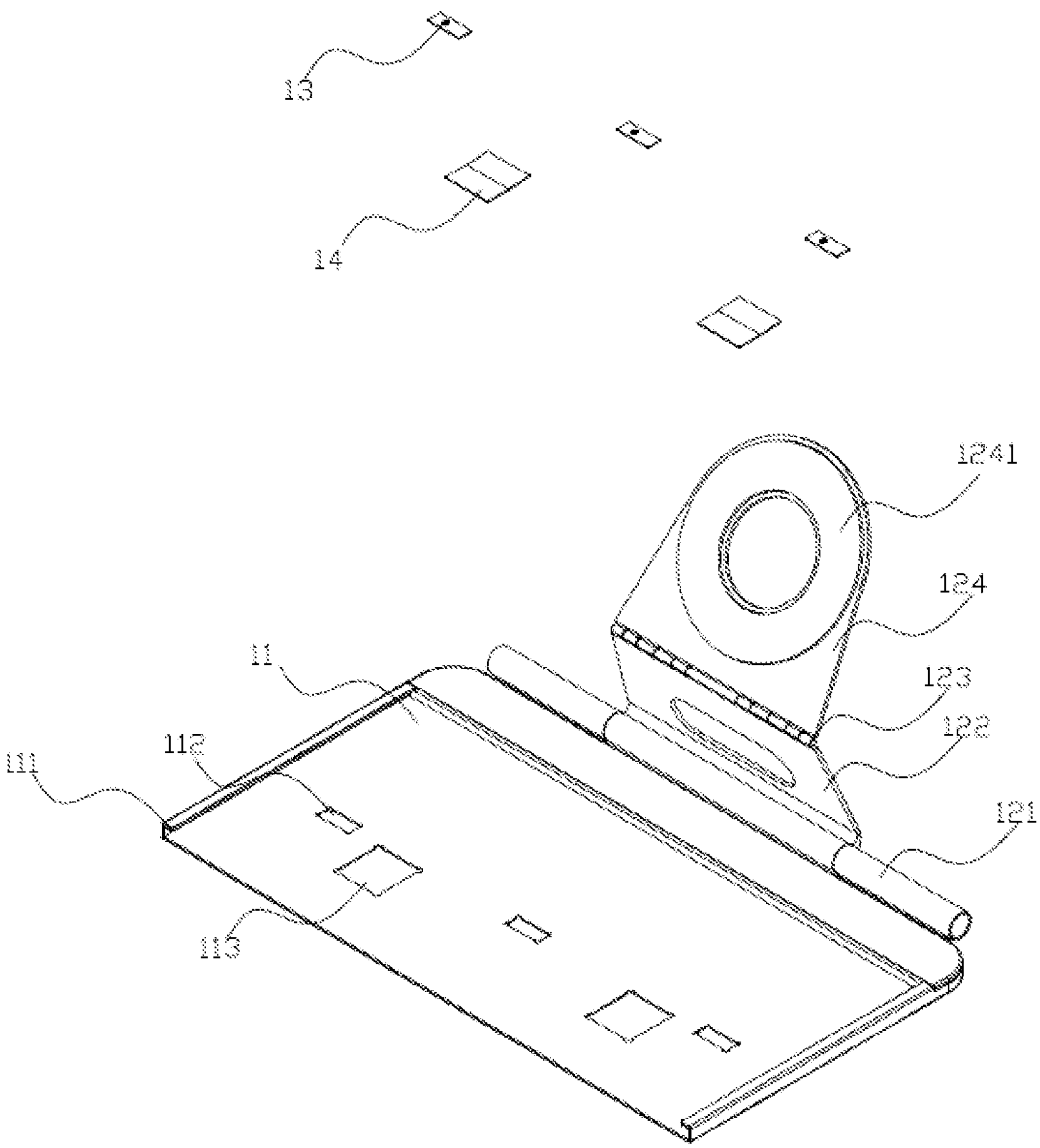
FIG. 5 is a schematic diagram of an exploded structure of the base bracket mechanism shown in FIG. 4.

Referring to FIG. 5, at least one first accommodating groove 112 and at least one accommodating cavity 113 are respectively arranged in the base body 11, at least one first magnetic member 13 is fixedly arranged in the corresponding first accommodating groove 112, and at least one restraint block 14 is fixedly arranged in the corresponding accommodating cavity 113. Specifically, the first magnetic member 13 and the restraint block 14 are respectively fixed in the first accommodating groove 112 and the accommodating cavity 113 via glue.

Figure 4:
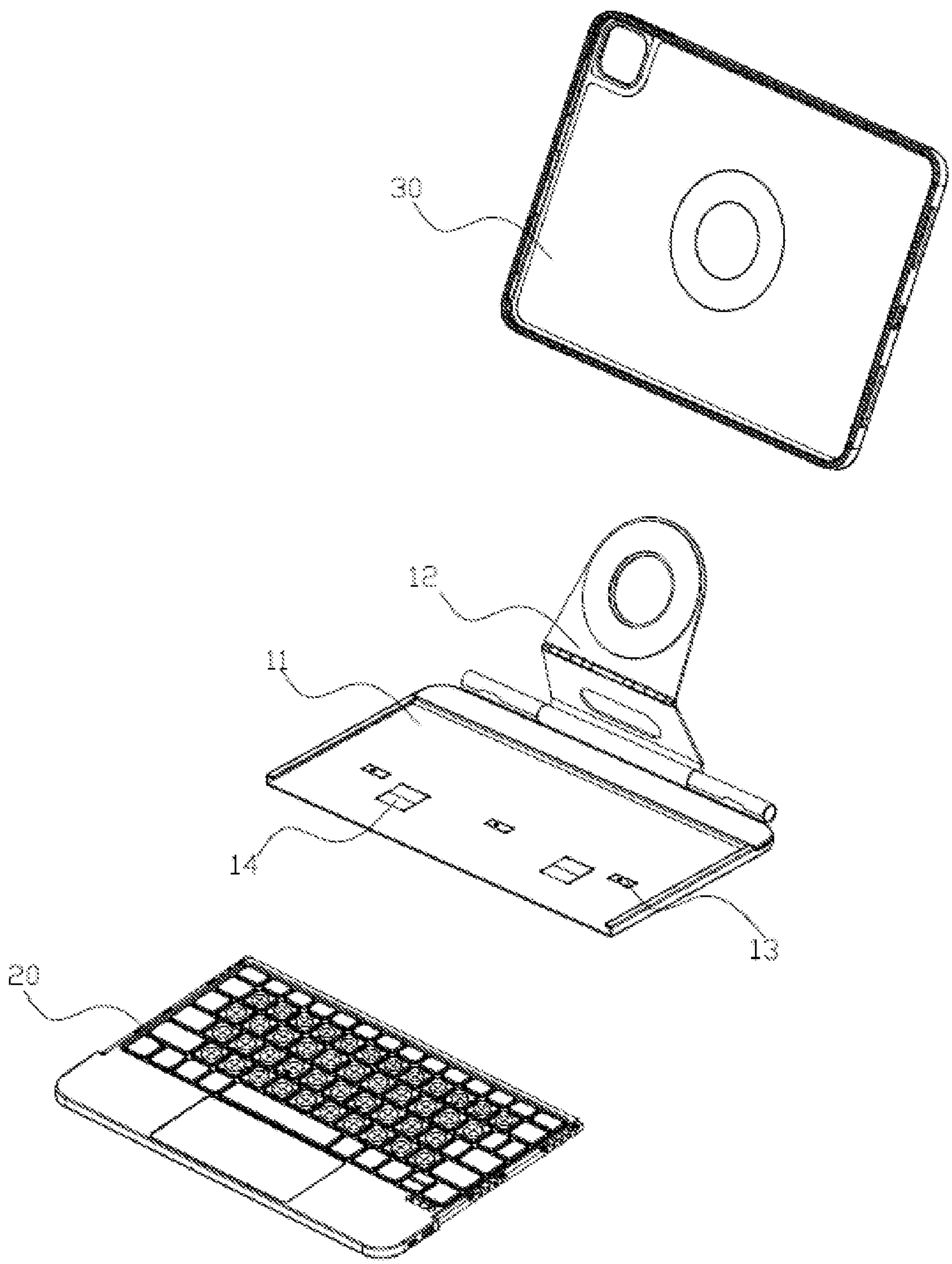
FIG. 4 is a schematic diagram of an exploded structure of a pull-out keyboard assembly (including a base bracket mechanism and a keyboard mechanism) shown in FIG. 3 in the second use state in the present invention.

Referring to FIG. 4 and FIG. 5, in this embodiment, the rotating shaft bracket assembly 12 includes a first rotating shaft 121, a connecting plate 122, a second rotating shaft 123, and a bracket 124; the connecting plate 122 is movably arranged on the base body 11 through the first rotating shaft 121, and an angle of the connecting plate can be adjusted relative to the base body 11; and the bracket 124 is movably arranged on the connecting plate 122 through the second rotating shaft 123, and an angle of the bracket can be adjusted relative to the connecting plate 122. The protective housing 30 is arranged on the bracket 124, and the first rotating shaft 121, the connecting plate 122, the second rotating shaft 123, and the bracket 124 are mutually fitted, to drive angle adjustment of the tablet computer arranged in the protective housing 30 relative to the base body 11, so that the user can view the tablet computer at different visual angles. Specifically, the first rotating shaft 121 and the second rotating shaft 123 are damped rotating shafts; and the bracket 124 is provided with a magnetic portion 1241, and the protective housing 30 can be detachably and rotatably arranged on the bracket 124 through an attraction effect of the magnetic portion 1241, so that an angle of the protective housing 30 can be adjusted relative to the bracket 124.

Figure 6:
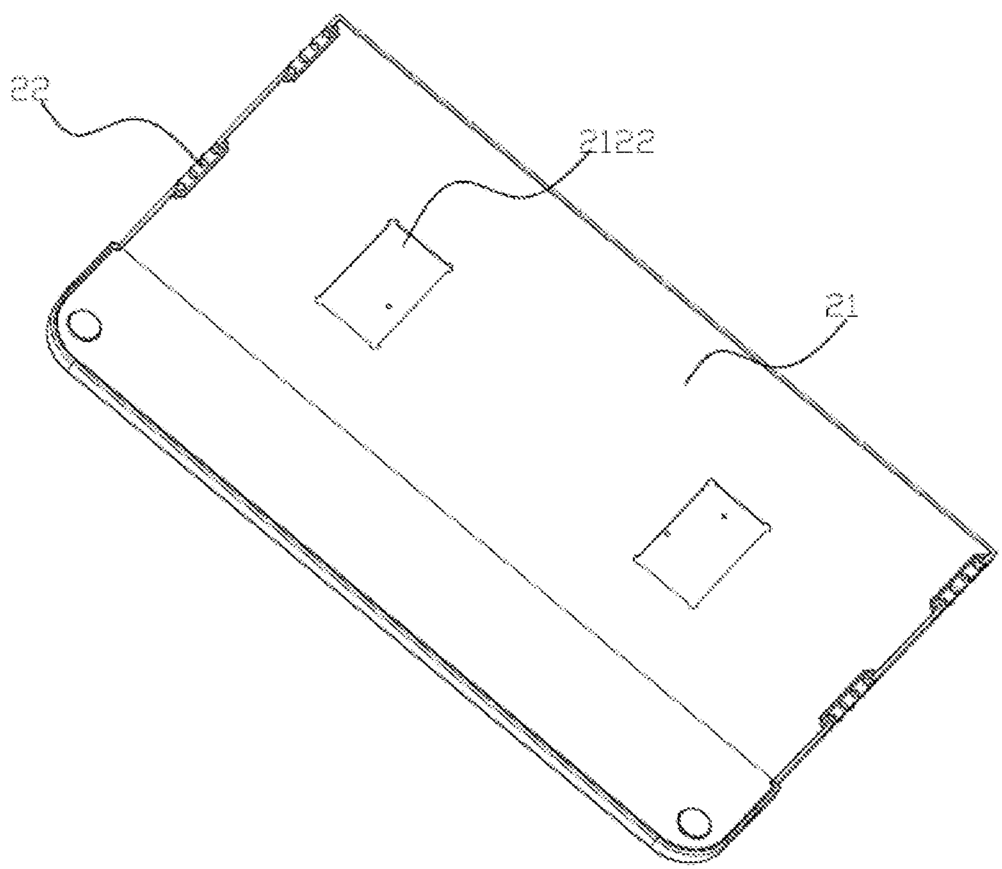
FIG. 6 is a schematic structural diagram of the keyboard mechanism shown in FIG. 4.
Figure 7:
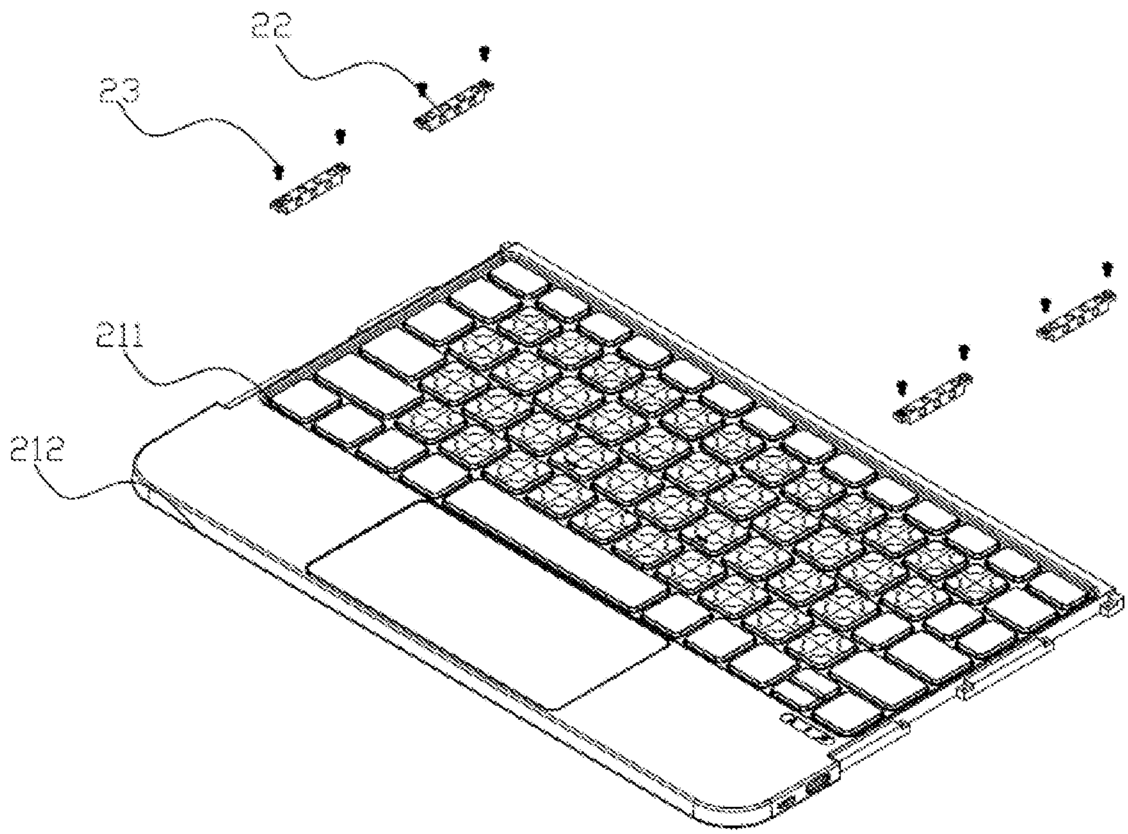
FIG. 7 is a schematic diagram of an exploded structure of the keyboard mechanism (including a keyboard assembly and a ball assembly) shown in FIG. 4.

Referring to FIG. 4, FIG. 6, and FIG. 7, in this embodiment, the keyboard mechanism 20 includes a keyboard assembly 21 and multiple ball assemblies 22; two ends of the keyboard assembly 21 are respectively movably arranged in the corresponding sliding grooves 111; and the multiple ball assemblies 22 are respectively arranged on the opposite sides of the keyboard assembly 21 and can come into contact with inner walls of the sliding grooves 111, so that sliding movements of the keyboard assembly 21 and the sliding groove 111 become rolling movements, thereby facilitating the movement of the keyboard assembly 21 in the sliding groove 111 under pulling with smaller force.

Figure 8:
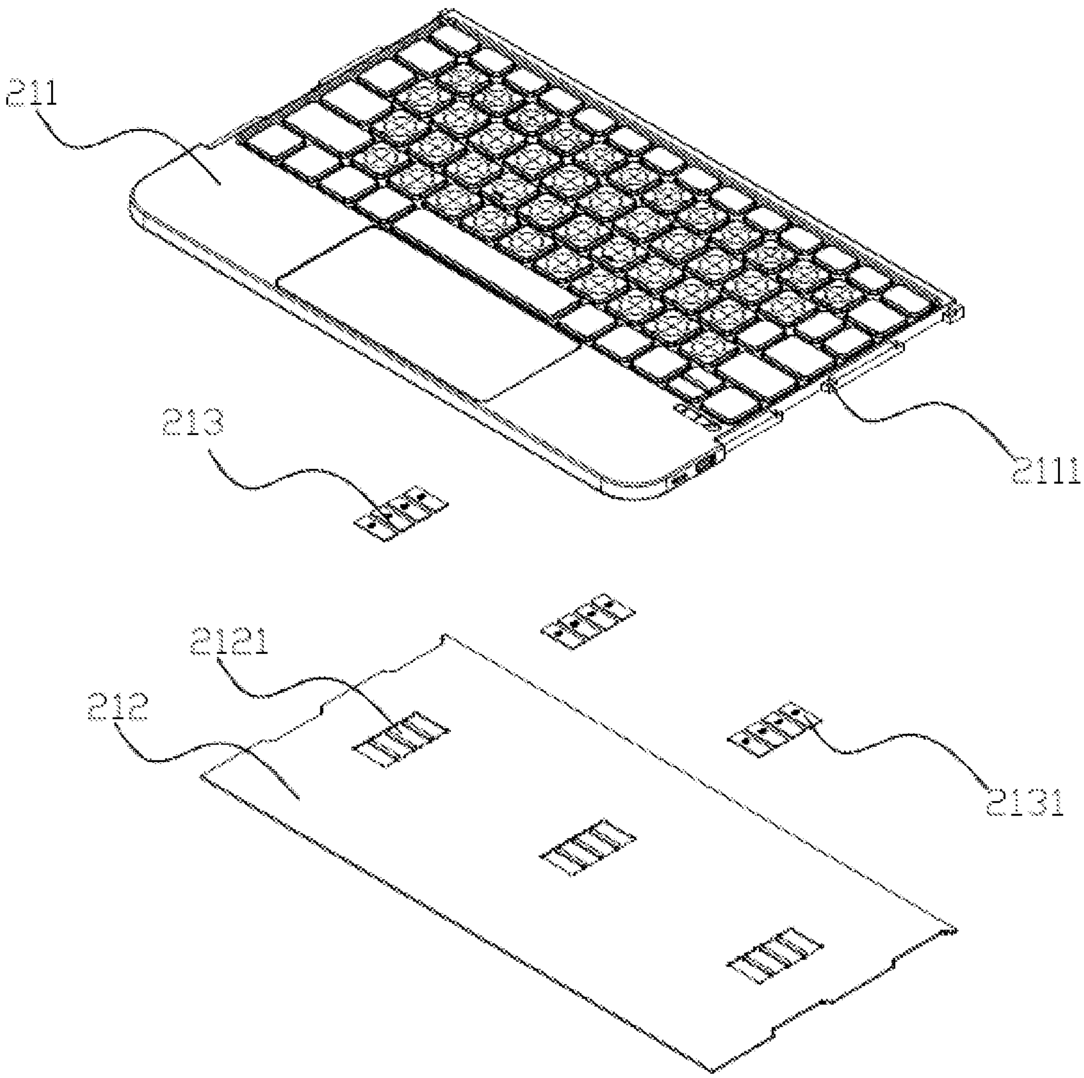
FIG. 8 is a schematic diagram of an exploded structure of the keyboard assembly shown in FIG. 7.

Referring to FIG. 7 and FIG. 8, the keyboard assembly 21 includes a keyboard body 211, a keyboard bottom plate 212, and at least one restraint magnetic set 213. The keyboard body 211 is a wireless keyboard, and preferably, the keyboard body 211 is a Bluetooth wireless keyboard. The keyboard bottom plate 212 is fixedly arranged on the keyboard body 211. At least one restraint magnetic set 213 is fixedly arranged on an outer or inner side of the keyboard bottom plate 212, corresponding to a position of the corresponding first magnetic member 13, and relative positions of the keyboard assembly 21 and the base body 11 are fixed through the attraction effect of the restraint magnetic set 213 and the corresponding first magnetic member 13. In this embodiment, the three restraint magnetic sets 213 are respectively fixedly arranged on the inner side of the keyboard bottom plate 212 and correspond to positions of the corresponding first magnetic members 13 respectively. In other embodiments, the number of restraint magnetic sets 213 may be one or more than one. The number of restraint magnetic sets may be further set larger according to an actual need, provided that this application is satisfied.

Referring to FIG. 7 and FIG. 8, specifically, multiple fixing seats 2111 are arranged on two opposite sides of the keyboard body 211, multiple ball assemblies 22 are fixedly arranged on the corresponding fixing seats 2111 through fasteners 23, and preferably, the fasteners 23 are fastening screws. Multiple second accommodating grooves 2121 are arranged on the inner side of the keyboard bottom plate 212, and the restraint magnetic set 213 is fixedly arranged in the corresponding second accommodating groove 2121. A restraint cavity 2122 is arranged at a position, corresponding to the restraint block 14, on the outer side of the keyboard bottom plate 212, the restraint block 14 is movably arranged in the restraint cavity 2122, and the restraint block is fitted with the restraint cavity, to prevent the keyboard mechanism 20 from slipping off the base body 11. Specifically, the restraint magnetic set 213 includes multiple second magnetic members 2131 arranged in parallel along a Y-axis direction, and the multiple second magnetic members 2131 can respectively attract corresponding first magnetic members 13, to fix relative positions of the keyboard assembly 21 and the base body 11. In this embodiment, the first magnetic member 13 and the second magnetic member 2131 are magnets. In other embodiments, the first magnetic member 13 may be a magnet and the second magnetic member 2131 is an iron block. In some other embodiments, the first magnetic member 13 may be an iron block and the second magnetic member 2131 is a magnet.

Figure 9:
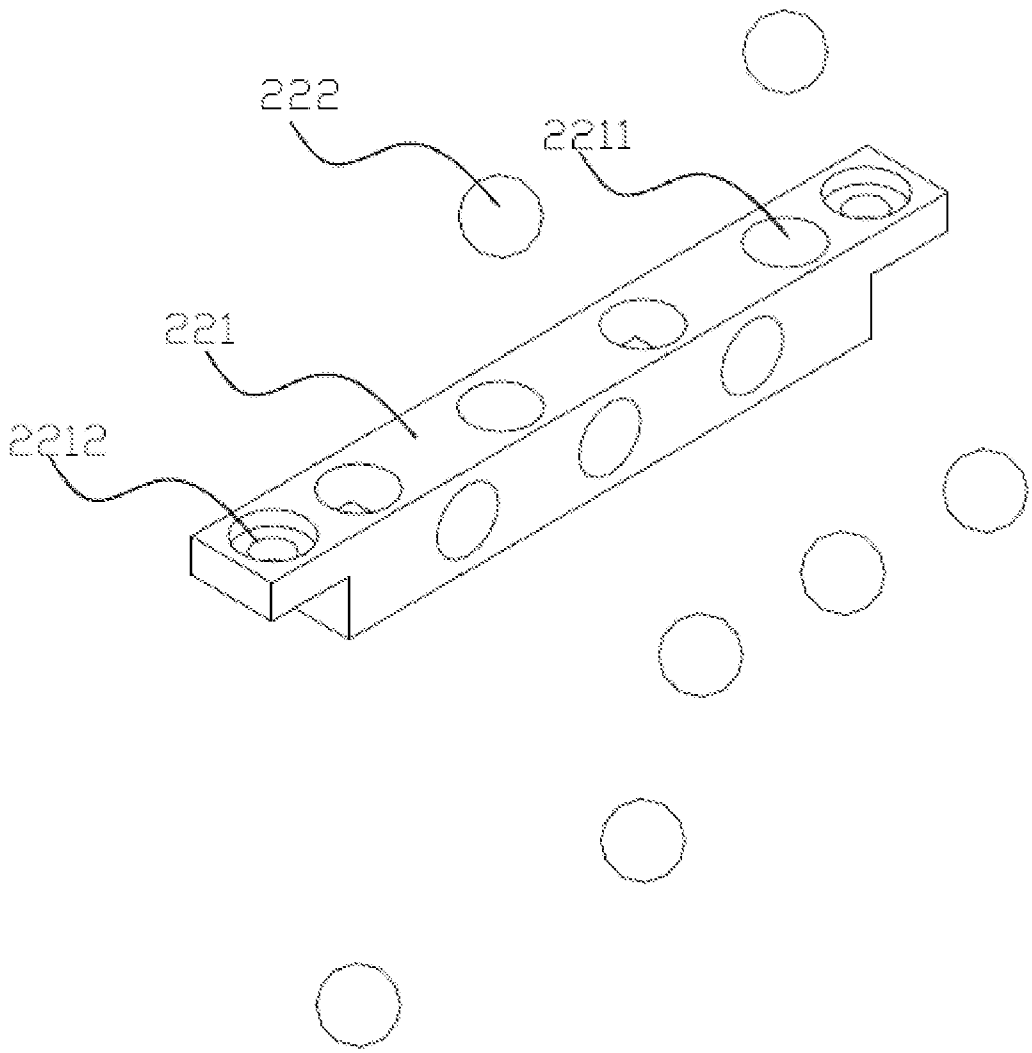
FIG. 9 is a schematic diagram of an exploded structure of the ball assembly shown in FIG. 7.

Referring to FIG. 6, FIG. 7, and FIG. 9, the ball assembly 22 includes a support frame 221 and at least one ball body 222. The support frame 221 is fixedly arranged on a side of the keyboard assembly 21. At least one ball body 222 is movably arranged on the support frame 221 and comes into rolling contact with the inner wall of the sliding groove 111, so that the keyboard assembly 21 can be rolled relative to the sliding groove 111.

Referring to FIG. 9, in this embodiment, the support frame 221 is provided with at least one ball hole 2211, and the ball body 222 is movably arranged in a corresponding ball hole 2211 and comes into rolling contact with the inner wall of the sliding groove 111. At least one fixing hole 2212 is also arranged through the support frame 221 and the fastener 23 fixes the support frame 221 onto a corresponding fixing seat 2111 through the fixing hole 2212.

It should be noted that a specific working process of the pull-out keyboard assembly in the present invention is as follows: When the relative positions of the keyboard assembly 21 and the base body 11 need to be adjusted, the keyboard assembly 21 is pushed and pulled with great force, so that the keyboard assembly 21 moves in the sliding groove 111. When the keyboard assembly is in place after pushing and pulling, the relative positions of the keyboard assembly 21 and the base body 11 are fixed through magnetic attraction force of the first magnetic member 13 and the corresponding second magnetic member 2131. Because the multiple ball assemblies 23 are arranged on both sides of the keyboard assembly 21, the keyboard assembly 21 is moved relative to the base body 11 more conveniently with smaller force, and the restraint block 14 is fitted with the restraint cavity 2122, so that the keyboard mechanism 20 can be effectively prevented from falling off the base body 11, thereby ensuring that the relative positions of the keyboard assembly 21 and the base body 11 are adjusted in limited movement space.

Technical features in the foregoing embodiments can be randomly combined. For brevity, not all possible combinations of the technical features in the embodiments are described. However, so long as the combinations of these technical features are not contradictory, the combinations should be considered as falling within the range recorded in this specification.

The foregoing embodiments only describe several embodiments of the present invention, and the descriptions are specific and detailed, but should not be construed as a limitation on the patent scope of the present invention. It should be noted that a person of ordinary skills in the art may further make several changes and improvements without departing from the concept of the present invention, and these changes and improvements shall fall within the protection scope of the present invention. Therefore, the patent protection scope of the present invention shall be subject to the appended claims.

What is claimed is:

1. A pull-out keyboard assembly, comprising:

a base bracket mechanism, comprising a base body, wherein the base body is respectively provided with sliding grooves at two opposite ends; a rotating shaft bracket assembly movably arranged on the base body;

and at least one restraint block and at least one first magnetic member respectively fixedly arranged on the base body;

a keyboard mechanism, comprising a keyboard assembly, wherein two ends of the keyboard assembly are respectively movably arranged in corresponding sliding grooves of the provided sliding grooves; and multiple ball assemblies that are respectively arranged on opposite sides of the keyboard assembly and that come into contact with inner walls of the sliding grooves, wherein the keyboard assembly is fixedly provided with at least one restraint magnetic set, the restraint magnetic set comprises multiple second magnetic members arranged in parallel along a Y-axis direction, and the multiple second magnetic members respectively mutually attract corresponding first magnetic members of the at least one first magnetic members, to implement fixation of different relative positions of the keyboard mechanism with respect to the base bracket mechanism; and a protective housing, arranged on the rotating shaft bracket assembly, wherein the protective housing can be snap-fitted onto the keyboard mechanism through the rotating shaft bracket assembly, and a tablet computer is detachably arranged in the protective housing.

2. The pull-out keyboard assembly according to claim 1, wherein the first magnetic member and the second magnetic member are magnets.

3. The pull-out keyboard assembly according to claim 1, wherein the at least one first magnetic member is a magnet and each of the multiple second magnetic members is an iron block.

4. The pull-out keyboard assembly according to claim 1, wherein the at least one first magnetic member is an iron block and each of the multiple second magnetic members is a magnet.

5. The pull-out keyboard assembly according to claim 1, wherein at least one first accommodating groove of the sliding grooves is arranged in the base body and at least one first magnetic member is fixedly arranged in a corresponding first accommodating groove of the sliding grooves .

6. The pull-out keyboard assembly according to claim 5, wherein at least one accommodating cavity is further arranged in the base body and at least one restraint block is fixedly arranged in a corresponding accommodating cavity of the at least one accommodating cavity.

7. The pull-out keyboard assembly according to claim 1, wherein the rotating shaft bracket assembly comprises a connecting plate, movably arranged on the base body through a first rotating shaft; and a bracket movably arranged on the connecting plate through a second rotating shaft.

8. The pull-out keyboard assembly according to claim 7, wherein the first rotating shaft and the second rotating shaft are both damped rotating shafts.

9. The pull-out keyboard assembly according to claim 7, wherein a magnetic portion is arranged on the bracket and the protective housing is detachably and rotatably arranged on the bracket through the magnetic portion.

10. The pull-out keyboard assembly according to claim 1, wherein the keyboard assembly further comprises a keyboard body and a keyboard bottom plate; the keyboard bottom plate is fixedly arranged on the keyboard body; and a restraint magnetic set of the at least one restraint magnetic set is fixedly arranged on an outer or inner side of the keyboard bottom plate.

11. The pull-out keyboard assembly according to claim 10, wherein the keyboard body is a wireless keyboard.

12. The pull-out keyboard assembly according to claim 10, wherein multiple fixing seats are arranged on two opposite sides of the keyboard body and the multiple ball assemblies are fixedly arranged on corresponding fixing seats through fasteners.

13. The pull-out keyboard assembly according to claim 12, wherein the fastener is a fastening screw.

14. The pull-out keyboard assembly according to claim 10, wherein multiple second accommodating grooves are arranged on an inner side of the keyboard bottom plate and the restraint magnetic set is fixedly arranged in a corresponding second accommodating groove.

15. The pull-out keyboard assembly according to claim 14, wherein a restraint cavity is arranged at a position, corresponding to the restraint block, on the outer side of the keyboard bottom plate and the restraint block is movably arranged in the restraint cavity.

16. The pull-out keyboard assembly according to claim 12, wherein the ball assembly comprises a support frame, fixedly arranged on a side of the keyboard assembly; and at least one ball body that is movably arranged on the support frame and that comes into rolling contact with an inner wall of one of the provided sliding grooves.

17. The pull-out keyboard assembly according to claim 16, wherein at least one ball hole is arranged in the support frame and the ball body is movably arranged in a corresponding ball hole and comes into rolling contact with the inner wall of the provided sliding groove.

18. The pull-out keyboard assembly according to claim 17, wherein at least one fixing hole is also arranged through the support frame and the fastener fixes the support frame onto a corresponding fixing seat through the fixing hole.

* * * * *